US011991694B2

(12) United States Patent
Chen et al.

(10) Patent No.: US 11,991,694 B2
(45) Date of Patent: May 21, 2024

(54) COMMUNICATION SYSTEM

(71) Applicant: NEC Corporation, Tokyo (JP)

(72) Inventors: Yuhua Chen, Tokyo (JP); Neeraj Gupta, Tokyo (JP); Jagdeep Ahluwalia Singh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 17/258,343

(22) PCT Filed: Jul. 8, 2019

(86) PCT No.: PCT/JP2019/026975
§ 371 (c)(1),
(2) Date: Jan. 6, 2021

(87) PCT Pub. No.: WO2020/013124
PCT Pub. Date: Jan. 16, 2020

(65) Prior Publication Data
US 2021/0274529 A1    Sep. 2, 2021

(30) Foreign Application Priority Data
Jul. 10, 2018   (GB) ..................... 1811311

(51) Int. Cl.
*H04W 72/12*     (2023.01)
*H04W 72/1273*   (2023.01)
*H04W 72/543*    (2023.01)

(52) U.S. Cl.
CPC ..... *H04W 72/1273* (2013.01); *H04W 72/543* (2023.01)

(58) Field of Classification Search
CPC ......... H04W 28/0263; H04W 28/0268; H04W 72/1236; H04W 72/1273; H04W 76/22
See application file for complete search history.

(56) References Cited

U.S. PATENT DOCUMENTS

2018/0324631 A1*  11/2018  Jheng ................. H04L 5/0055
2021/0368381 A1*  11/2021  You .................. H04W 28/0268

FOREIGN PATENT DOCUMENTS

WO      2018/084795 A1      5/2018
WO   WO-2018084795 A1 *     5/2018   ........ H04W 28/0263
WO      2018/144855 A1      8/2018

OTHER PUBLICATIONS

LG Electronicsincetal,DiscussiononBearerContextModification,3G PPDRAFT;R3-182056,3GPPTSG-NWG3#99bis,China,Apr. 16-20, 2018 (Year: 2018).*
ZTE etal,DiscussiononSDAPDATAPDUforreflectiveQoS,3GPPDR AFT;R2-1802012,3GPPTSG-RANWG2 leeting#101,Greece,Feb. 26-Mar. 2, 2018 (Year: 2018).*
(Continued)

*Primary Examiner* — Romani Ohri

(57) ABSTRACT

A communication system is described in which a base station transmits, to a UE (user equipment), via a data radio bearer (DRB), a downlink data packet that includes information identifying a data flow. The downlink data packet is transmitted prior to commencement of transmission, via that DRB, of data packets comprising any downlink user-plane data associated with the identified data flow.

4 Claims, 12 Drawing Sheets

(56) References Cited

OTHER PUBLICATIONS

Intel Corporationetal,Updates to stage2 QoS flow,3GPP TSG-RAN WG2 Meeting#100, R2-1712687 Meeting#100,USA,Nov. 27-Dec. 1, 2017 (Year: 2017).*
LG Electronics Incetal, Discussion on Bearer Context Modification,3 GPP TSG-RAN WG3#99bis, R3-182056 ,China, Apr. 16-20, 20183 (Year: 2018).*
ZTE,ReflectiveQoSimpactonE1interface,3GPPDRAFT;R3-174413,3GPPTSG-RANWG3#98USA,Nov. 27-Dec. 1, 2017 (Year: 2017).*
ZTE et al, Discussion on SDAP Data PDU for reflective QoS,3GPP Draft; R2-1800441, 3GPP TSG-RAN WG2 NR Ad hoc 0118, Canada, Jan. 22-26, 2018 (Year: 2018).*
Qualcomm Incorporated: "Flow QoS Support in Dual Connectivity", 3GPP TSG-RAN WG3 meeting #96 R3-171796, No. R3-171796, May 19, 2017 (May 19, 2017), pp. 1-2, XP051265665, Hangzhou, China (Year: 2017).*
International Search Report for PCT Application No. PCT/JP2019/026975, dated Sep. 11, 2019.
Written opinion for PCT Application No. PCT/JP2019/026975, dated Sep. 11, 2019.
Search Report for GB1811311.8 dated Jan. 10, 2019.
'NGMN 5G White Paper' V1.0 by the Next Generation Mobile Networks (NGMN) Alliance, Feb. 17, 2015.
3GPP Technical Specification (TS) 23.501 v15.2.0, Jun. 2018.
3GPP TS 37.324 v15.0.0, Sep. 2018.
3GPP TS 38.331 v15.1.0, Mar. 2018.
3GPP TS 38.300 v15.2.0, Jun. 2018.
3GPP TS 38.401 V15.1.0, Mar. 2018.
ZTE et al,Discussion on SDAP Data PDU for reflective QoS, 3GPP Draft; R2-1802012, 3GPP TSG-RAN WG2 Meeting #101, Greece, Feb. 26-Mar. 2, 2018.
ZTE et al,Discussion on SDAP Data PDU for reflective QoS, 3GPP Draft; R2-1800441, 3GPP TSG-RAN WG2 NR Ad hoc 0118, Canada, Jan. 22-26, 2018.
ZTE,Discussion on reflective QoS, 3GPP Draft; R2-1708127, 3GPP TSG-RAN WG2 Meeting #99, Germany, Aug. 21-25, 2017.
Intel Corporation et al,Updates to stage 2 QoS flow, 3GPP Draft; R2-1712687, 3GPP TSG-RAN WG2 Meeting #100, USA, Nov. 27-Dec. 1, 2017.
ZTE,Reflective QoS impact on E1 interface, 3GPP Draft; R3-174413, 3GPP TSG-RAN WG3 #98, USA, Nov. 27-Dec. 1, 2017.
LG Electronics Inc et al,Discussion on Bearer Context Modification, 3GPP Draft; R3-182056, 3GPP TSG-RAN WG3 #99bis, China, Apr. 16-20, 2018.
JP Office Action for JP Application No. 2020-573054, dated May 24, 2022 with English Translation.
LG Electronics Inc., "Miscellaneous corrections for SDAP", 3GPP TSG RAN WG2 adhoc_2018_07_NR R2-1800526.
CMCC, "Short QFI in SDAP header", 3GPP TSG RAN WG2 #101bis R2-1805525.
EP Office Action for EP Application No. 19744880.6, mailed on Nov. 24, 2023.
Spreadtrum Communications, "Considerations on ACK of RDI", 3GPP TSG-RAN WG2 NR AH1807 Meeting R2-1809562, 3rd Generation Partnership Project (3GPP), Jun. 21, 2018, XP051525418, pp. 1-pp. 2.

* cited by examiner

COMMUNICATION SYSTEM

This application is a National Stage Entry of PCT/JP2019/026975 filed on Jul. 8, 2019, which claims priority from Great Britain Patent Application 1811311.8 filed on Jul. 10, 2018, the contents of all of which are incorporated herein by reference, in their entirety.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to data flow mapping in the so-called '5G' (or 'Next Generation') systems.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network. Various details of 5G networks and network slicing are described in, for example, the 'NGMN 5G White Paper' V1.0 by the Next Generation Mobile Networks (NGMN) Alliance, which document is available from https://www.ngmn.org/5g-white-paper.html.

The next-generation mobile networks must support diversified service requirements, which have been classified into three categories by the International Telecommunication Union (ITU): Enhanced Mobile Broadband (eMBB), Ultra-Reliable and Low-Latency Communications (uRLLC) and Massive Machine Type Communications (mMTC). eMBB aims to provide enhanced support of conventional MBB, with focuses on services requiring large and guaranteed bandwidth such as High Definition (HD) video, Virtual Reality (VR) and Augmented Reality (AR); uRLLC is a requirement for critical applications such as automated driving and factory automation, which require guaranteed access within a very short time; mMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

In order to support such diverse QoS requirements (possibly within the same UE), user-plane traffic (each data packet) is classified based on associated QoS parameters and associated with an appropriate data radio bearer (DRB) that meets the QoS requirements for that type of traffic. Specifically, the so-called user plane function (UPF) performs the classification of downlink (DL) user-plane traffic based on appropriate QoS rules. Similarly, the UE performs the classification of uplink (UL) user-plane traffic (including association of UL traffic to appropriate QoS flows, based on applicable QoS rules). The applicable QoS rules may be either explicitly provided to the UE (e.g. during session establishment or modification), pre-configured in the UE, or implicitly derived by the UE by applying Reflective QoS. Further details of the packets to QoS flow mapping may be found in 3GPP Technical Specification (TS) 23.501 v15.2.0, the contents of which are incorporated herein by reference.

The Reflective QoS functionality enables the UE to map uplink user-plane traffic to the appropriate QoS flows without obtaining explicit QoS rules from the network. This is achieved by the UE creating QoS rules based on downlink (DL) traffic received at the UE. Reflective QoS is controlled on a per-packet basis using a so-called Reflective QoS Indication (RQI) in the header of the data packets together with an identifier (a QoS Flow Identifier, QFI) of the flow to which that particular data packet belongs, and a Reflective QoS Timer (RQ Timer) value that may be signalled to the UE upon session establishment (or session modification). Alternatively, the RQ Timer may be set to a default value (in which case there is no need to explicitly signal the applicable RQ Timer value to the UE).

3GPP TS 37.324 v15.0.0 describes the Service Data Adaptation Protocol (SDAP) and provides further details on mapping a QoS Flow (data packets) to the appropriate DRB for that QoS Flow. In summary, a QoS Flow to DRB mapping rule (hereinafter: 'DRB mapping') is used for determining the DRB on which data packets for a particular QoS Flow shall be carried. In case of Reflective DRB mapping, the UE monitors the DRB mapping applied by the network in the downlink direction and, for each QFI, the UE determines the applicable DRB mapping autonomously (i.e. which QFI is mapped to which DRB). Thus, when the UE has uplink data to send which is associated with a particular QFI, the UE knows which DRB to use for that QFI.

In addition, the network may also configure the UE with an appropriate DRB mapping via RRC signalling, as described in 3GPP TS 38.331 v15.1.0. Specifically, when the DRB mapping is configured by the network using RRC (or other explicit signalling), the network informs the UE which QoS Flows (which QFIs) to map to which particular DRB (optionally, which QFIs are no longer mapped to a particular DRB).

FIG. 7 illustrates an exemplary scenario with explicit signalling (from the base station to the UE) of the parameters for mapping data packets to appropriate DRBs. As can be seen, in this case the DRB mapping information, including a new QFI, is transmitted to the UE (in step 3) prior to communicating user-plane data on the DRB associated with that QFI (in step 7). FIG. 8 illustrates an exemplary scenario without explicit signalling. As can be seen, in this case the DRB mapping information, including a new QFI, is transmitted to the UE (in step 3) when communicating downlink user-plane data to the UE. In this case the UE can update its DRB mapping table (step 4) based on the downlink data packet(s) received from the base station and communicate any subsequent user-plane data on the appropriate DRB associated with that QFI (as generally shown in step 5). The scenarios shown in FIGS. 7 and 8 are based on 3GPP TS 38.300 v15.2.0, the contents of which are incorporated herein by reference.

3GPP also agreed that for DRBs configured with an SDAP header, QoS flow mappings created based on Reflective QoS to DRB mapping may also be updated with explicit signalling and vice versa. In other words, the appropriate DRB mapping may be created and/or updated by either method shown in FIGS. 7 and 8.

SUMMARY OF INVENTION

However, the inventors have realised that there are a number of issues that are not addressed by the current DRB mapping techniques. For example, since it is not necessary to configure the UE with an appropriate DRB mapping at DRB establishment (as shown in FIG. 7) or at DRB modification, there might be situations in which the UE applies (or continues to apply) an incorrect DRB mapping and transmits UL data packets on an inappropriate DRB (e.g. a DRB that may not meet the QoS requirements for those UL data packets). Such situation may arise when, in accordance with Reflective QoS Flow to DRB mapping, the UE creates the mapping rule and applies it to uplink traffic after the first downlink packet has been received on a given flow. However, if there is uplink data to transmit before (successful) receipt of any downlink packet, the UE will map the uplink data packets to a default DRB and transmit the data packets using that DRB. However, this may not be the intention of the network and the UE's DRB mapping may result in less than optimal handling of the data packets and potential violation of the associated QoS requirements.

Another issue relating to DRB mapping may arise when CP-UP split is employed in the access network (base station), i.e. when the control-plane (CP) and the user-plane (UP) functionalities are split between different entities (or units). In this case, the QoS flow to DRB mapping is configured by the CP entity, however, downlink DRB mapping and monitoring of the UE's uplink mapping is done by the UP entity (or UP entities if more than one). However, when there is an error in the DRB mapping (e.g. when the UE sends, before receipt of any downlink data packet, an uplink data packet using an incorrect DRB and potentially to an incorrect UP entity), the CP entity may not be able to correct the UE's DRB mapping without delay since it does not handle the data packets.

The present invention seeks to provide methods and associated apparatus that address or at least alleviate the above issues.

Although for efficiency of understanding for those of skill in the art, the invention will be described in detail in the context of a 3GPP system (5G networks), the principles of the invention can be applied to other systems in which slice scheduling is performed.

In one example aspect, the invention provides a first method performed by an item of user equipment (UE), the method comprising: receiving at least one downlink data packet, via a data radio bearer (DRB), that includes information identifying a data flow; and identifying a mapping of the data flow to the DRB based on the information identifying the data flow in the at least one downlink data packet; wherein the at least one downlink data packet that includes information identifying a data flow is received prior to commencement of reception, via the DRB, of data packets comprising downlink user-plane data associated with the identified data flow.

In one example aspect, the invention provides a method performed by network apparatus serving an item of user equipment (UE), the method comprising: transmitting, to the UE, via a data radio bearer (DRB), at least one downlink data packet that includes information identifying a data flow; wherein the at least one downlink data packet that includes information identifying a data flow is transmitted prior to commencement of transmission, via the DRB, of data packets comprising downlink user-plane data associated with the identified data flow.

In one example aspect, the invention provides a method performed by a user plane entity of a distributed base station apparatus, the method comprising: determining whether or not an item of user equipment (UE) has information identifying a mapping of a data flow to a data radio bearer (DRB) associated with that UE; and when it is determined that the UE does not have the information identifying said mapping, providing, to a control plane entity, information identifying the data flow for which the UE does not have the information identifying said mapping.

In one example aspect, the present invention provides a method performed by a control plane entity of a distributed base station apparatus, the method comprising: obtaining, from a user plane entity, information identifying a data flow for which an item of user equipment (UE) does not have information identifying a mapping to a data radio bearer (DRB) associated with that UE.

In one example aspect, the present invention provides a method performed by a user plane entity of a distributed base station apparatus, the method comprising: determining whether or not an item of user equipment (UE) has information identifying a mapping of a data flow to a data radio bearer (DRB) associated with that UE; and when it is determined that the UE does not have the information identifying said mapping, transmitting, to the UE, at least one downlink data packet that includes information identifying the data flow; wherein the at least one downlink data packet that includes information identifying a data flow is transmitted, via the DRB, prior to commencement of transmission, via that DRB, of data packets comprising downlink user-plane data associated with the identified data flow.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Figure 1:
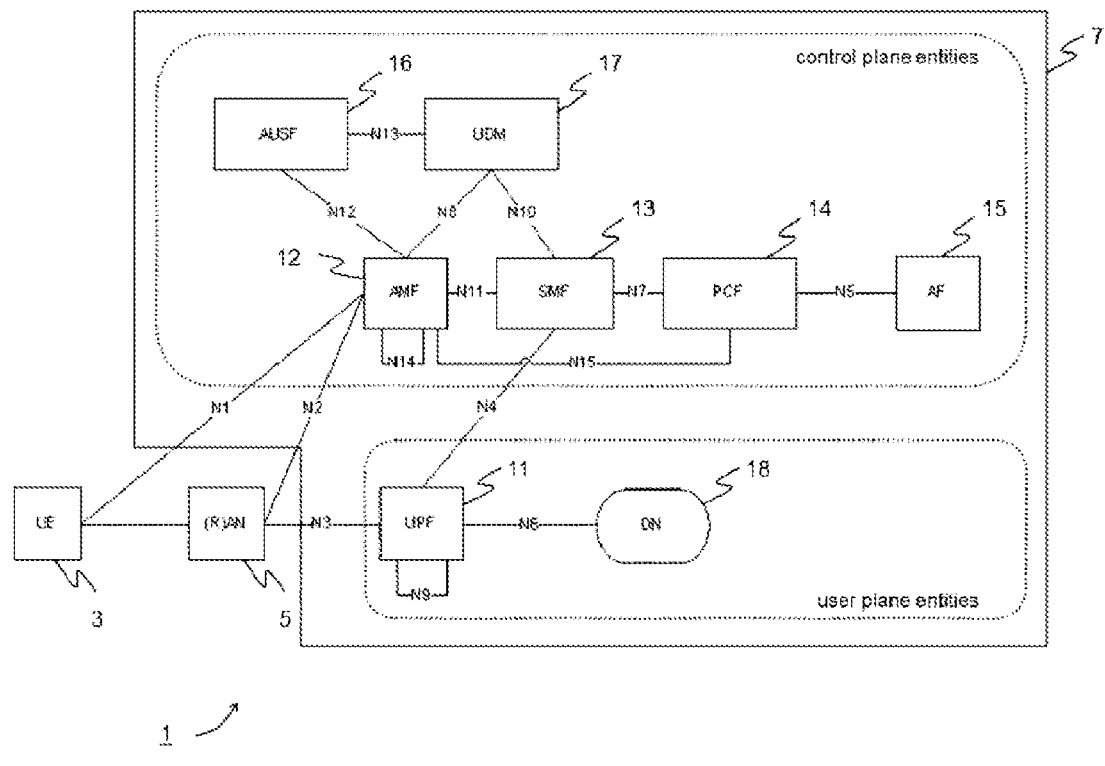
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst four mobile devices 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G protocols, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include, user plane entities and control plane entities. The user plane entities include, amongst others, user plane functions (UPFs) 11. In this example, the control plane entities include, amongst others, an Access and Mobility Function (AMF) 12. It will be appreciated that the core network 7 may also include one or more of the following: a Session Management Function (SMF) 13, a Policy Control Function (PCF) 14, an Operations and Maintenance (OAM) function (not shown), an Application Function (AF) 15, an Authentication Server Function (AUSF) 16, a Unified Data Management (UDM) entity 17, amongst others. The core network 7 is also coupled (via the UPF 11) to a Data Network (DN) 18, such as the Internet or a similar Internet Protocol (IP) based network.

Figure 2:
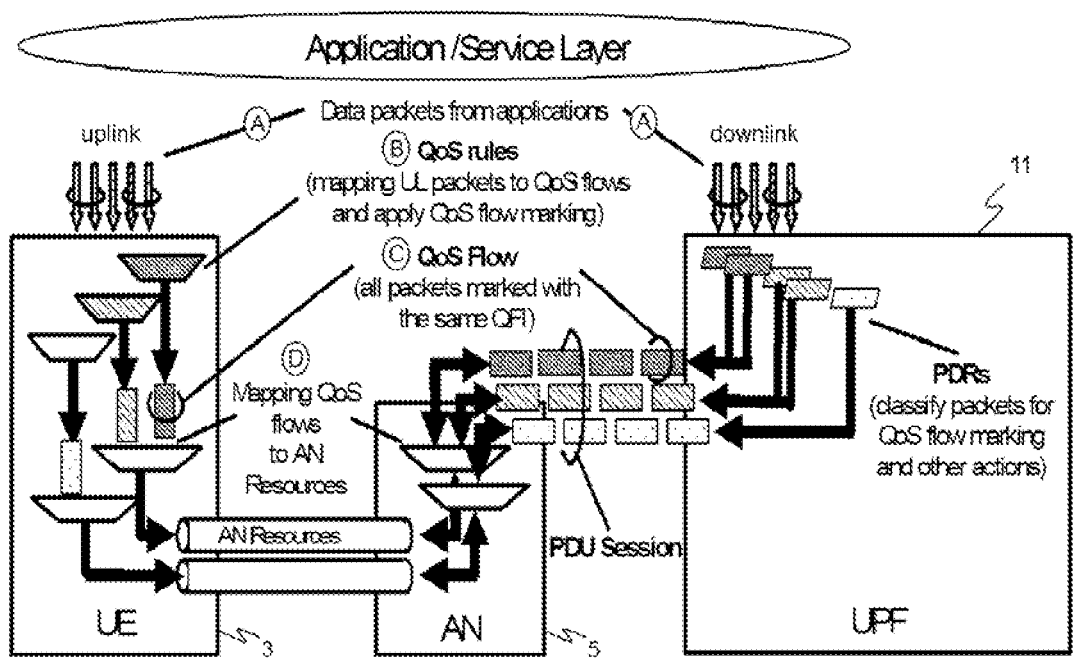
FIG. 2 illustrates schematically an example of handling data packets in the system 1 shown in FIG. 1.

FIG. 2 illustrates schematically an example of handling data packets in the system 1 shown in FIG. 1. This example focuses on packet handling between the UE 3 and the UPF 11 including packet handling in the access network (base station 5). As can be seen, data packets from the application/service layer are sent to lower layers (as indicated by the letter 'A'). This is performed by the UE 3 for uplink packets and by the UPF 11 for downlink packets. Next, as denoted by the letter 'B', the UE 3 applies appropriate QoS rules to uplink data packets (by mapping each uplink packet to an appropriate QoS Flow and applying appropriate QoS flow marking). Similarly, the UPF 11 performs, amongst others, classification of downlink packets for QoS flow marking using the applicable rules. As generally shown at the letter 'C', packets marked with the same QFI form a QoS Flow. As shown between the UPF 11 and the access network, a Protocol Data Unit (PDU) session for a particular UE 3 may include a plurality of QoS Flows, each having an associated set of QoS requirements. At letter 'D', which generally corresponds to the radio layer, the QoS Flows are mapped to appropriate access node (base station) resources (in other words, the QoS Flows are mapped to DRBs) and the data packets are then transmitted via the appropriate DRB associated with the QFI within each data packet.

In the example shown in FIG. 2, there are five different applications or services transmitting data (at point 'A') which are mapped to three different QoS Flows (at point 'B') which are then mapped to two DRBs (at point 'D') for transmission between the UE 3 and the base station 5.

Figure 3:
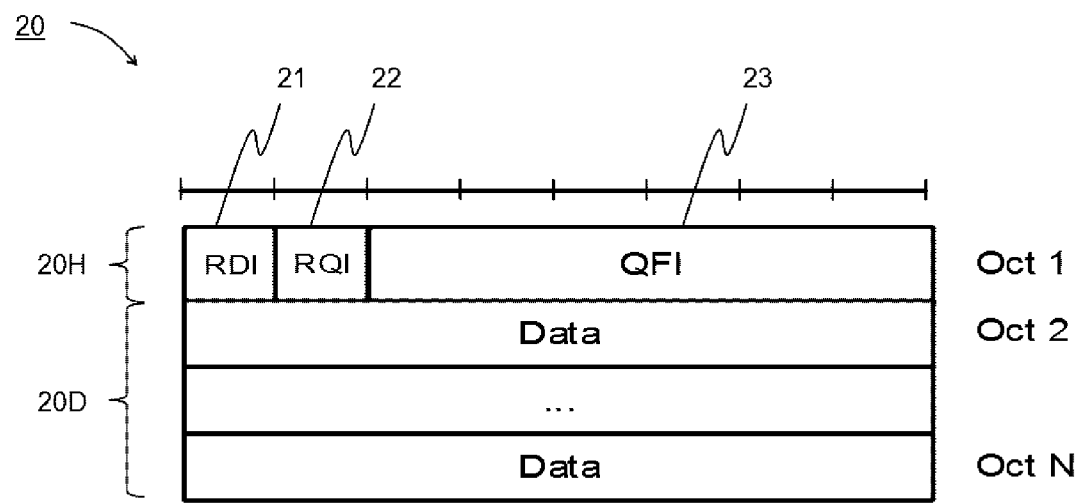
FIG. 3 illustrates schematically an exemplary data packet.

FIG. 3 illustrates schematically an exemplary data packet 20. As can be seen, the data packet 20 includes a header portion 20H and a data portion 20D. As previously explained, the header 20D of the data packet 20 includes a 'Reflective QoS flow to DRB mapping Indication' (RDI) 21, the Reflective QoS Indication (RQI) 22, and the QoS Flow Identifier (QFI) 23 (which are referred to as QoS flow marking above). In this example, the RDI 21 (one bit), the RQI 22 (one bit), and the QFI 23 (six bits) occupy one octet (eight bits) of the header 20H. Although not shown in FIG. 3, it will be appreciated that the header 20H may also include other fields, e.g. between the octet ('Oct 1' in FIG. 3) carrying the RDI/RQI/QFI and the data portion 20D. The data portion 20D includes a number of octets (at least one octet) which carry user-plane data for the UE 3 (for the application/service layer thereof). It will be appreciated that the data referred to in FIG. 3 may also include one or more (higher layer) headers, if appropriate.

It will be appreciated that the RQI 22 in a particular data packet may be set to a specific value (e.g. '1') for those data packets that are subject to Reflective QoS and set to a different value (e.g. '0') for those data packets that are not subject to Reflective QoS. Accordingly, the UE 3 is configured to derive the applicable QoS rules based on only those packets that have their RQI 22 set to the specific value (in this example, '1').

Similarly, it will be appreciated that the RDI 21 in a particular data packet may be set to a specific value (e.g. '1') for those data packets that are subject to Reflective QoS flow to DRB mapping and set to a different value (e.g. '0') for those data packets that are not subject to Reflective QoS flow to DRB mapping. Accordingly, the UE 3 is configured to derive the applicable QoS flow to DRB mapping rules based on only those packets that have their RDI 21 set to the specific value (in this example, '1').

Reflective QoS enables the UE 3 to map uplink user-plane traffic to the appropriate QoS flows without obtaining explicit QoS rules from the network (the core network 7).

Reflective QoS flow to DRB mapping enables the UE 3 to map an uplink QoS flow to the appropriate DRB without obtaining explicit flow to DRB mapping rules from the network (the base station 5). Beneficially, in this example, the UE 3 is able to determine the correct DRB mapping even before receipt of any user-plane data on the downlink and without requiring explicit signalling of the DRB mapping rules from the network via the control-plane (e.g. RRC). This is achieved by the base station 5 sending a special downlink data packet 20 (e.g. an SDAP PDU) which does not include any user data 20D.

This special data packet 20, however, includes an appropriate header portion 20H (e.g. one octet) which includes the QFI 23 corresponding to the DRB used for sending the special data packet 20 (and hence the DRB to be used by the UE 3 for transmitting any subsequent uplink data packet having the same QFI 23). It will be appreciated that the RDI 21 in the data packet 20 is set to a specific value (e.g. '1') indicating that this data packet 20 is to be used for mapping, at the UE 3, the QoS Flow identified by the QFI 23 to the given DRB.

When the control-plane and user-plane functionalities of the base station 5 are split between different units (entities) the user-plane entity 5-UP is beneficially configured to notify the control-plane entity 5-CP about any problems regarding the DRB mapping used by the UE 3 (e.g. no mapping for a particular QFI, a QFI being mapped to an incorrect DRB, mapping information at the UE 3 has expired, and/or the like).

In more detail, when the user-plane entity 5-UP determines that the UE 3 uses an incorrect DRB mapping, the user-plane entity 5-UP sends an appropriately formatted signalling message (e.g. a 'Bearer Context Modification Required' message) to the corresponding control-plane entity 5-CP serving the UE 3. The 'Bearer Context Modification Required' message (or a similar message to that effect) includes at least one of: information identifying any QoS Flows to be mapped; and information identifying any QoS Flows mapped to an incorrect DRB. Based on this message, the control-plane entity 5-CP is able to provide new/updated DRB mapping information to the UE 3, either using explicit (control-plane) signalling or by instructing the user-plane entity 5-UP to update the DRB mapping in the UE 3 via appropriately formatted downlink data packets (e.g. using the above described header).

User Equipment (UE)

Figure 4:
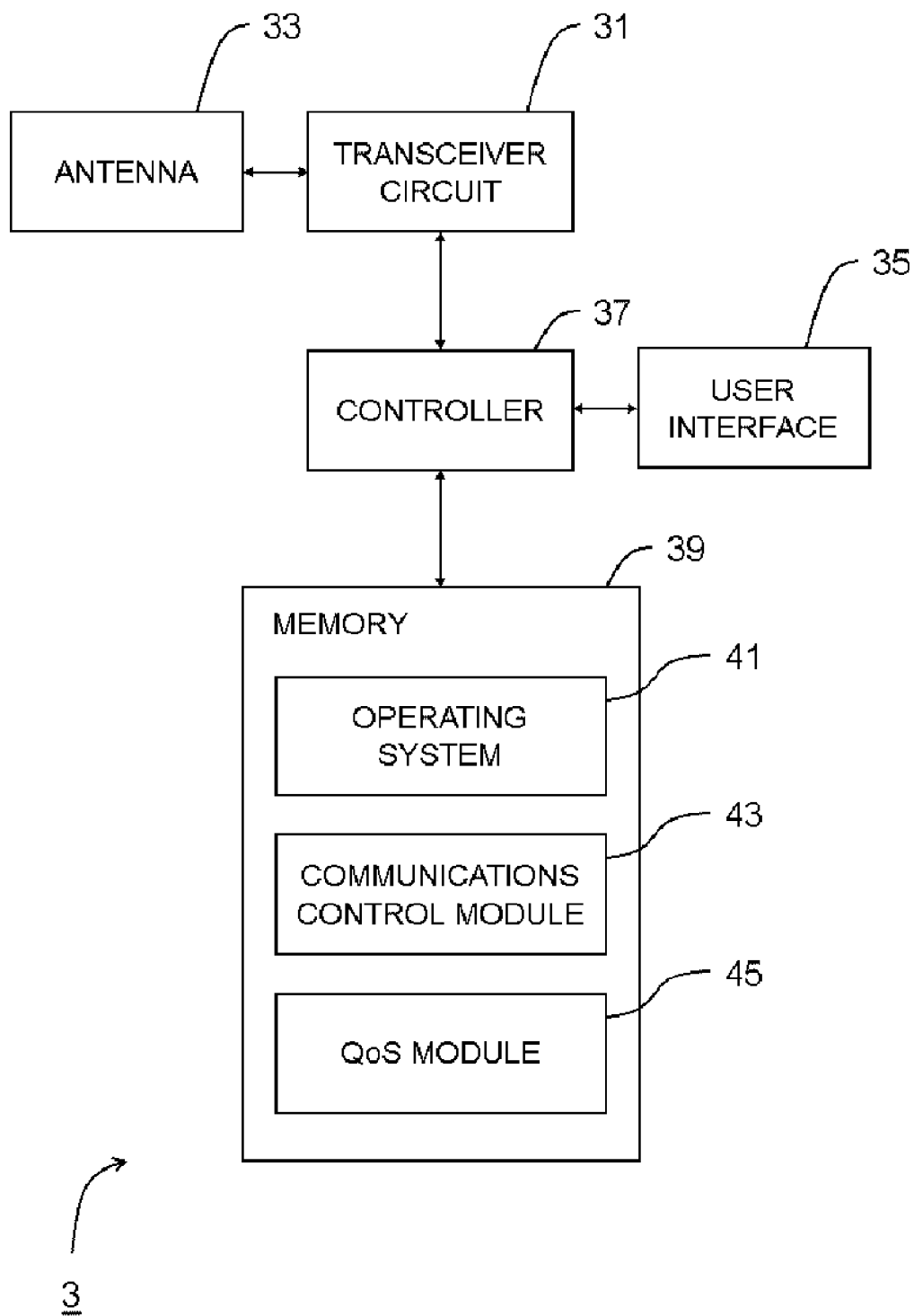
FIG. 4 is a schematic block diagram of a mobile device forming part of the system shown in FIG. 1.

FIG. 4 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 4, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and a Quality of Service (QoS) module 45.

The communications control module 43 is responsible for handling (generating/sending/receiving) signalling messages and uplink/downlink data packets between the UE 3 and other nodes, including (R)AN nodes 5 and core network nodes. The signalling may comprise signalling related to the above described DRB mapping.

The QoS module 45 is responsible for performing the UE specific procedures ('A' to 'D') described above with reference to FIG. 2.

Access Network Node (Base Station)

Figure 5:
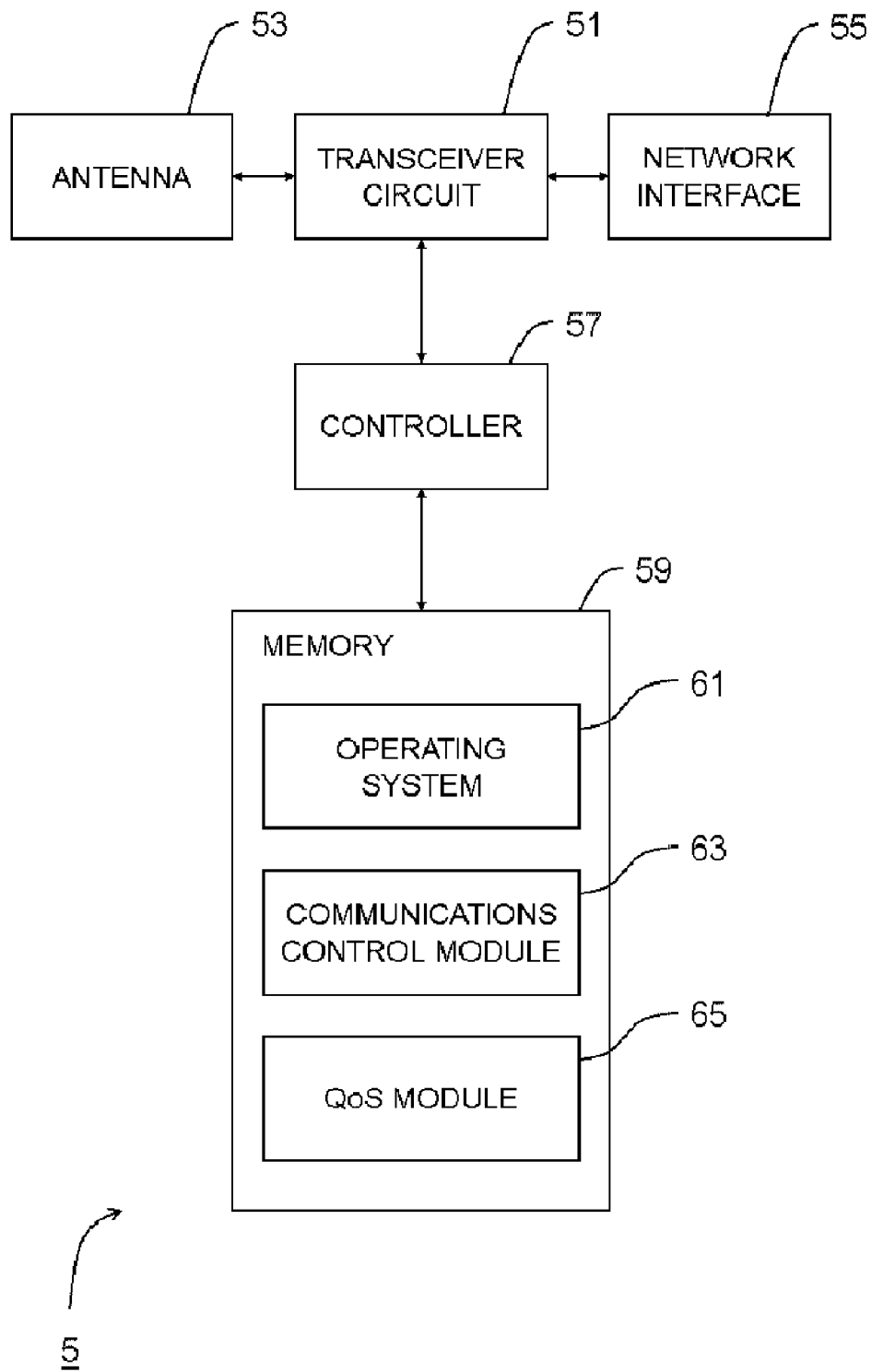
FIG. 5 is a schematic block diagram of an access network node (e.g. base station) forming part of the system shown in FIG. 1.

FIG. 5 is a block diagram illustrating the main components of the base station 5 (or a similar access network node) shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55.

The network interface 55 typically includes an appropriate base station base station interface (such as X2/Xn) and an appropriate base station core network interface (such as S1/N1/N2/N3). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, a communications control module 63, and a Quality of Service (QoS) module 65.

When CP-UP split is employed, the base station 5 may be split into separate control-plane and user-plane entities, each of which may include an associated transceiver circuit 51, antenna 53, network interface 55, controller 57, memory 59, operating system 61, and communications control module 63 (amongst others). When the base station 5 comprises a distributed base station, the network interface 55 also includes an E1 interface and an F1 interface (F1-C for the control plane and F1-U for the user plane) to communicate signals between respective functions of the distributed base station.

The communications control module 63 is responsible for handling (generating/sending/receiving) signalling between the base station 5 and other nodes, such as the UE 3 and the core network nodes. When CP-UP split is employed, the communications control module 63 is also responsible for communications (generating, sending, and receiving signalling messages) between the control-plane and user-plane parts of the base station 5. The signalling may comprise signalling related to the above described DRB mapping.

The QoS module 65 is responsible for performing the base station specific procedures ('A' to 'D') described above with reference to FIG. 2.

Core Network Function

Figure 6:
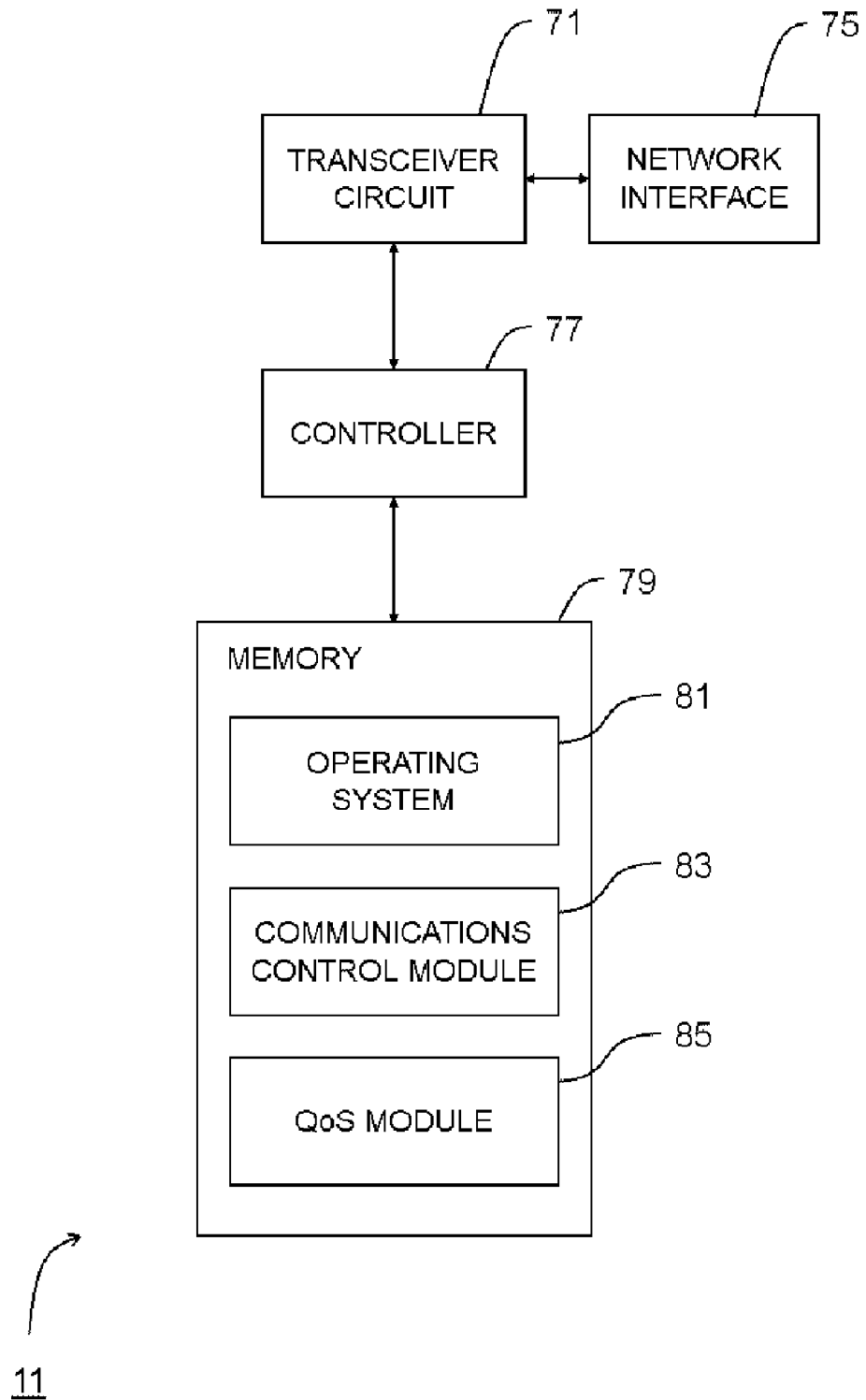
FIG. 6 is a schematic block diagram of a core network node forming part of the system shown in FIG. 1.

FIG. 6 is a block diagram illustrating the main components of a generic core network function, such as the UPF 11 or the AMF 12 shown in FIG. 1. As shown, the core network function includes a transceiver circuit 71 which is operable to transmit signals to and to receive signals from other nodes (including the UE 3, the base station 5, and other core network nodes) via a network interface 75. A controller 77 controls the operation of the core network function in accordance with software stored in a memory 79. The software may be pre-installed in the memory 79 and/or may be downloaded via the telecommunication network 1 or from a removable data storage device (RMD), for example. The software includes, among other things, an operating system 81, a communications control module 83, and a QoS module 85.

The communications control module 83 is responsible for handling (generating/sending/receiving) signaling between the core network function and other nodes, such as the UE 3, the base station 5, and other core network nodes. The signalling may comprise signalling related to the above described DRB mapping.

The QoS module 85 is responsible for performing the network (UPF) specific procedures (e.g. procedure 'D') described above with reference to FIG. 2.

Detailed Description

A more detailed description of some exemplary embodiments is provided below with reference to FIGS. 7 to 12.

First Example Embodiment

Figure 7:
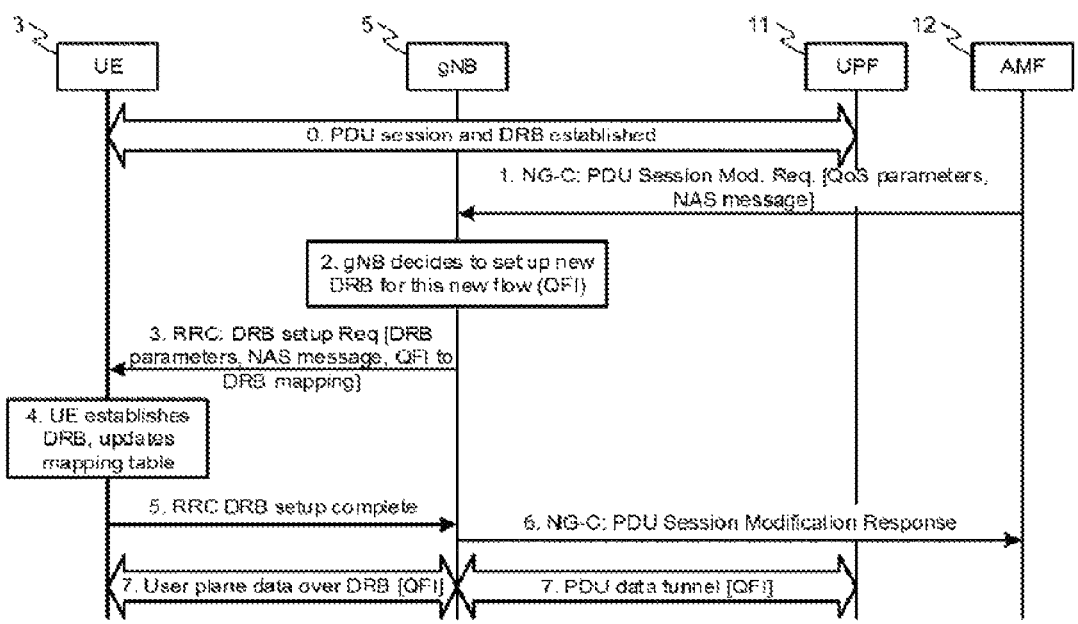
FIG. 7 illustrates schematically exemplary ways in which the base station can configure the mobile device for mapping data packets to appropriate data radio bearers.
Figure 8:
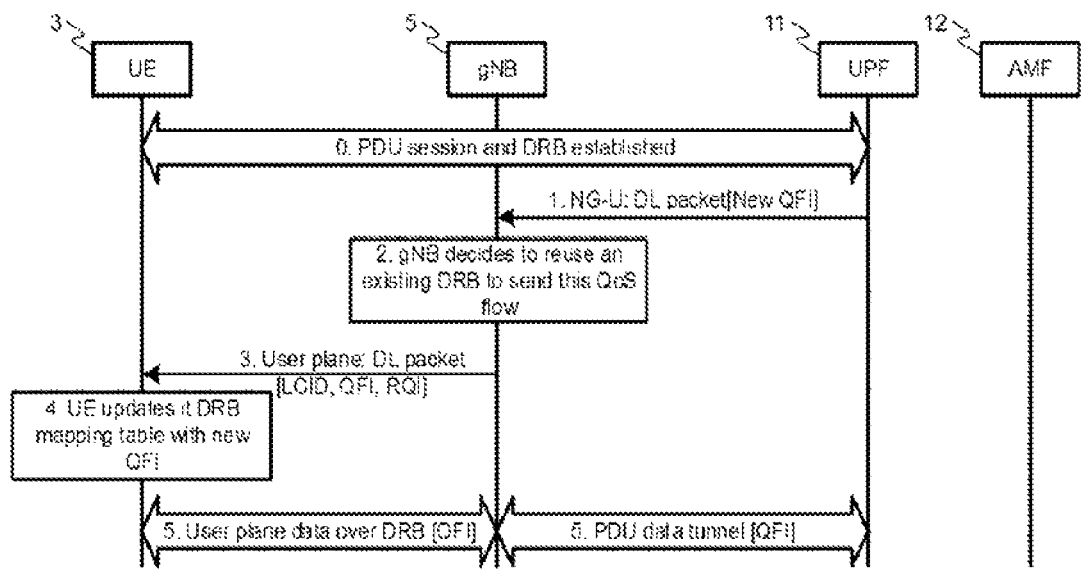
FIG. 8 illustrates schematically exemplary ways in which the base station can configure the mobile device for mapping data packets to appropriate data radio bearers.
Figure 9:
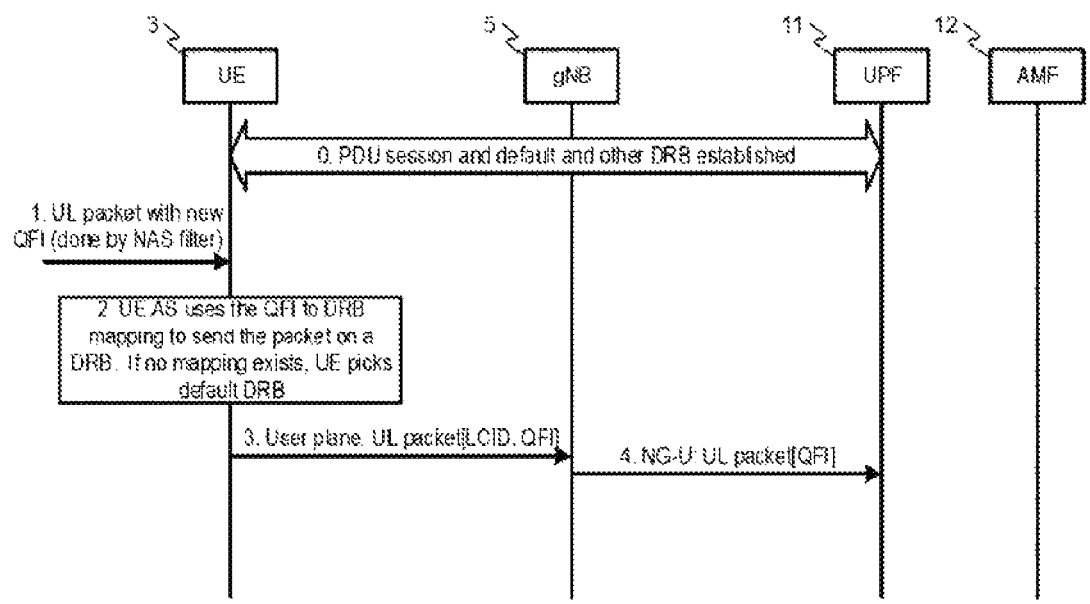
FIG. 9 illustrates schematically an exemplary procedure in which the mobile device maps a data packet to a default data radio bearer.

The UE 3 is configured to perform (using its QoS module 45) classification and marking of uplink user-plane traffic, i.e. the association of uplink traffic to appropriate QoS Flows, based on QoS rules and map each QoS Flow to an appropriate DRB based on DRB mapping rules. Normally the applicable QoS Flow to DRB mapping rules are obtained by the UE 3 from explicit control signalling from the base station 5 (as illustrated in FIG. 7) or the UE 3 creates QoS Flow to DRB mapping rules based on the received downlink traffic (as illustrated in FIG. 8). As described above, Reflective QoS Flow to DRB mapping enables the UE 3 to map an uplink flow to the appropriate DRB without obtaining explicit QoS Flow to DRB mapping rules from the network.

Beneficially, in this example, the UE 3 is able to determine the correct DRB mapping even before receipt of any user-plane data on the downlink and without requiring explicit signalling of the (QoS Flow to) DRB mapping rules from the network via the control-plane (e.g. RRC). This is achieved by the base station 5 (the user-plane component thereof) sending a special downlink data packet 20 (e.g. an SDAP PDU) which does not include any user data 20D. This special data packet 20, however, includes the QFI 23 corresponding to the DRB used for sending the special data packet 20 (and hence the DRB to be used by the UE 3 for transmitting any subsequent uplink data packet with the same QFI 23). For example, the QFI 23 may be included in an appropriate header portion 20H (comprising one octet in this example) of the data packet 20.

This example embodiment will be described in more detail with reference to FIG. 10, which illustrates an exemplary procedure using the special data packet 20.

As generally shown in step 0, the procedure starts with the UE 3 and the UPF 11/base station 5 establishing a PDU session and establishing at least a default DRB for the UE 3 (between the base station 5 and the UE 3). At this point, in this example, the network does not have any downlink/uplink data for the UE 3 on a particular QoS flow (in other words, this QoS flow has not started yet). When Reflective QoS flow to DRB mapping is used for this QoS flow, the network does not send any higher layer (e.g. RRC) control signalling to the UE 3 for configuring the UE's QoS Flow to DRB mapping corresponding to this QoS flow.

In this example, the UE 3 has uplink data (at least one uplink data packet) to transmit, as shown in step 1. The UE 3 determines the appropriate QFI 23 for the uplink data (using the QoS module 45 and a so-called Non-Access Stratum (NAS) filter) and submits the data to lower layers for transmission. Using its QoS module 45, the UE 3 determines (in step 2) the appropriate DRB for the uplink data based on the QFI 23. Specifically, if the QFI 23 is mapped to a specific DRB based on the stored DRB mapping rules (which are configured by network or established via reflective QoS beforehand), the UE 3 uses that DRB for transmitting the data. However, as shown in this example, if the QFI 23 associated with the uplink data packet is not mapped to any DRB based on the stored DRB mapping rules, the UE 3 is configured to use its default DRB for transmitting the data packet. In step 3, therefore, the UE 3 proceeds to transmit the data packet, via the default DRB. The uplink data packet in this example includes the actual uplink data (user data) and at least the QFI 23 associated with the data packet (and may also include an appropriate cell identifier, e.g. an 'LCID' and/or the like).

Upon receipt of the uplink data packet from the UE 3, the base station 5 (denoted 'gNB' in FIG. 10) forwards the uplink data packet (together with the associated QFI 23) to the UPF 11 (step 4).

Since in this example the uplink data was sent using the default DRB (and since the network may intend to use a different DRB for data packets having that particular QFI 23), the base station 5 proceeds to generate (using its QoS module 65) and send, in step 5, via the correct DRB, an appropriate (user-plane) downlink data packet 20 which does not include any user data 20D. However, the downlink data packet 20 in this example includes: an RDI 21 (which is set to an appropriate value (e.g. '1') indicating that the data packet 20 includes information relating to Reflective QoS flow to DRB mapping and hence to be used for updating DRB mapping at the UE 3; and the QFI 23 (that was used by the UE 3 in step 3). In other words, the downlink data packet 20 of this example includes only a header portion 20D (e.g. one octet for each QFI 23 for which the DRB carrying the data packet 20 is applicable for subsequent uplink transmissions by the UE 3).

Based on the received downlink data packet 20, the UE 3 is able to update its DRB mapping information (held by its QoS module 45) to reflect the correct mapping of the given QFI to the DRB via which the downlink data packet 20 was received.

Thus, when the UE 3 has any further uplink data packets with that QFI value, the UE 3 is beneficially able to determine the appropriate DRB for transmitting the uplink data packets to the base station 5.

Second Example Embodiment

Recently, it has been proposed that the functionality of a gNB (referred to herein as a 'distributed' gNB or distributed base station 5) may be split between one or more distributed units (DUs) and a central unit (CU) with a CU typically performing higher level functions and communication with the next generation core and with the DU performing lower level functions and communication over an air interface with UEs 3 in the vicinity (i.e. in a cell operated by the distributed base station 5).

Figure 11:
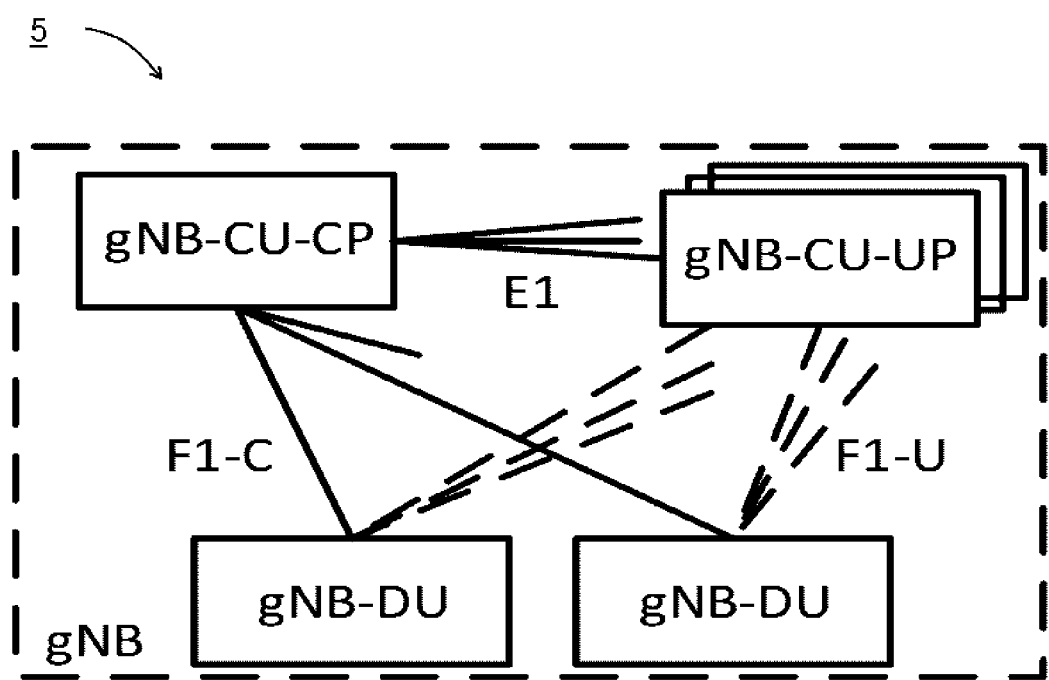
FIG. 11 illustrates schematically the components (functional units) of an exemplary distributed base station.

An example of such a distributed base station 5 is shown in FIG. 11, which includes the following functional units (in accordance with 3GPP TS 38.401 V15.1.0):

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU): a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Figure 12:
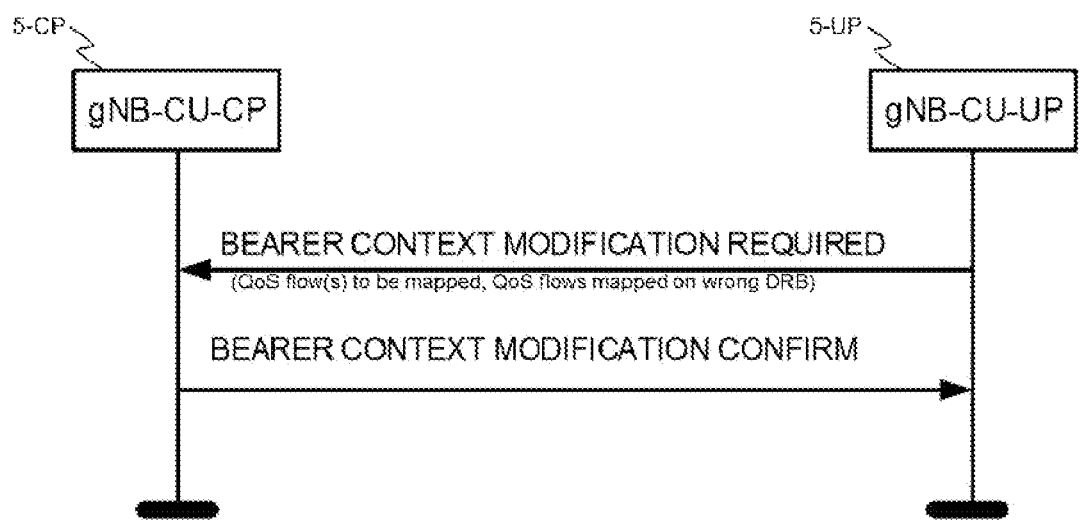
FIG. 12 illustrates schematically an exemplary procedure in accordance with an example embodiment of the present invention.

FIG. 12 illustrates schematically an exemplary procedure in which a user-plane entity 5-UP initiates:

modification of QoS mapping used by a UE 3 served by the base station 5 (in this case, the user-plane entity 5-UP detects that the UE3 is using, in uplink, a DRB mapping rule different to the rules configured and stored by the user-plane entity 5-UP); or request of DRB mapping rule for a QoS flow (in this case, the user-plane entity 5-UP found that there is no rule configured for this particular QoS flow).

In more detail, by monitoring data packets received, when the user-plane entity 5-UP (denoted 'gNB-CU-UP') determines that the UE 3 uses an incorrect DRB mapping (not shown in FIG. 12), then the user-plane entity 5-UP proceeds to generate and send an appropriately formatted signalling message to the corresponding control-plane entity 5-CP serving the UE 3. Specifically, in this example, the user-plane entity 5-UP generates and sends a 'Bearer Context Modification Required' message (or a similar message to that effect) and includes in this message information identifying any QoS Flows mapped to an incorrect DRB (and/or any QoS Flows not mapped to any DRB). When the user-plane entity 5-UP (denoted 'gNB-CU-UP') determines that the UE 3 uses a QoS flow ID sending data (not shown in FIG. 12), but there is no configured DRB mapping rule corresponding to that QoS flow, then the user-plane entity 5-UP proceeds to generate and send an appropriately formatted signalling message to the corresponding control-plane entity 5-CP serving the UE 3 and includes in this message information requesting DRB mapping rule for the identified QoS flow. The information may be included in one or more appropriate information elements of the 'Bearer Context Modification Required' message (or similar), as illustrated below table 1:

TABLE 1

| IE/Group Name | Presence | Range | IE type and reference | Semantics description | Criticallity | Assigned Criticallity |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System | M | | | | YES | reject |
| >E-UTRAN | | | | | | |
| | | SKIP unmodified rows | | | | |
| >NG-RAN | | | | | | |
| >>PDU Session Resource To Modify List | | 0 . . . 1 | | | YES | reject |
| >>>PDU Session Resource To Modify Item | | 1 . . . <maxnoofPDU SessionResource> | | | EACH | reject |
| >>>>PDU Session ID | M | | 9.3.1.21 | | — | — |
| >>>>NG-U DL UP Transport Layer Information | O | | UP Transport Layer Information 9.3.2.1 | | — | — |

TABLE 1-continued

| IE/Group Name | Presence | Range | IE type and reference | Semantics description | Criticallity | Assigned Criticallity |
|---|---|---|---|---|---|---|
| >>>>PDU Session Forwarding Information Response | O | | Data Forwarding Information Response 9.3.2.6 | | — | — |
| >>>>DRB To Modify List | | 0 ... 1 | | | YES | reject |
| >>>>>DRB To Modify Item | | 1 ... <maxnoofDRBs> | | | EACH | reject |
| >>>>>>DRB ID | M | | 9.3.1.16 | | — | — |
| >>>>>>DRB Data Forwarding information Response | O | | Data Forwarding Information Response 9.3.2.6 | | — | — |
| >>>>>>gNB-CU-UP Cell Group Related Configuration | O | | gNB-CU-UP Cell Group Related Configuration 9.3.1.34 | | — | — |
| >>>>>>Flow To Remove | O | | Qos Flow List 9.3.1.12 | | — | — |
| >>>>DRB To Remove List | | 0 ... 1 | | | YES | reject |
| >>>>>DRB To Remove Item | | 1 ... <maxnoofBRNs> | | | EACH | reject |
| >>>>>>DRB ID | M | | | | — | — |
| >>>>Fows To be Mapped List | | 0 ... 1 | | | YES | reject |
| >>>>>Flows To be Mapped Item | | 1 ... <maxnooflows> | | | EACH | reject |
| >>>>>>Flow ID | M | | | | — | — |
| >>>>Flows mapped on wrong DRB List | | 0 ... 1 | | | YES | reject |
| >>>>>>Flows mapped on wrong DRB Item | | 1 ... <maxnoofDRBs> | | | EACH | reject |
| >>>>>>Flow ID | M | | | | — | — |
| | | | SKIP unmodified rows | | | |

It will be appreciated that the user-plane entity 5-UP may be configured to determine whether at least one of the following criteria is met before notifying the control-plane entity 5-CP or the UE 3:
 if there are no matched rules, and a new flow is detected in downlink or uplink (which may be mapped to a default bearer temporarily):
  the user-plane entity 5-UP may be configured to request an appropriate rule from the control-plane entity 5-CP, i.e. information indicating on which DRB packets of this new QoS flow shall be carried; or
  the control-plane entity 5-CP decides a rule, then informs the user-plane entity 5-UP about the rule (or vice versa). In this case the UE 3 also needs to be informed:
   either by the control-plane entity 5-CP (e.g. via RRC); or
   the control-plane entity 5-CP may be configured to notify/request the user-plane entity 5-UP to configure UE via reflective way (either via the next regular downlink data packet for that flow or by sending a special data packet described above).
 if there are matched rules configured, and if reflective QoS flow to DRB mapping is not used for that flow, but the user-plane entity 5-UP detects that the uplink mapping used by the UE 3 is not correct (e.g. the flow is mapped to a default DRB instead):
  the user-plane entity 5-UP may be configured to inform the control-plane entity 5-CP about the packets of the QoS flow being carried on the wrong DRB; or
  the control-plane entity 5-CP may configure the rule to UE 3 (e.g. via RRC).
 If there are matched rules and if reflective QoS flow to DRB mapping is used, but the user-plane entity 5-UP detects that the uplink mapping used by the UE 3 is not correct (e.g. the flow is mapped to a default DRB instead):
  the user-plane entity 5-UP may be configured to send a packet (SDAP header only if no downlink data) to setup the rule in UE 3.

Figure 10:
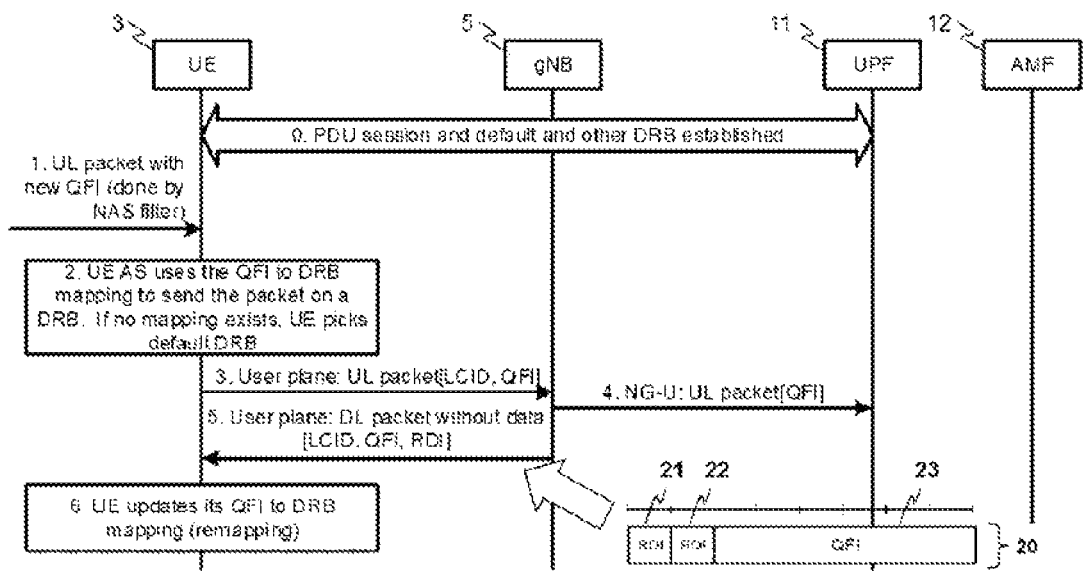
FIG. 10 illustrates schematically an exemplary procedure in accordance with an example embodiment of the present invention.

Based on the message from the user-plane entity 5-UP, the control-plane entity 5-CP is able to provide new/updated DRB mapping information to the UE 3, either using explicit (control-plane) signalling (e.g. as shown in FIG. 7) or instruct the user-plane entity 5-UP to provide the DRB mapping rule to the UE 3 via appropriately formatted downlink data packets (e.g. as shown in FIG. 8 or 10).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above description of FIG. 10, the base station indicates the correct DRB to be used for a particular QFI by sending an appropriately formatted 'header-only' downlink data packet. However, it will be appreciated that if the DRB used by the UE in step 3 (default DRB) is the correct DRB for that particular QFI, then the base station may be configured to confirm the UE's DRB mapping by sending the above described 'header-only' downlink data packet. Alternatively, the base station may be configured to confirm the UE's DRB mapping by not sending any downlink packet (at least until the network has user-plane data for the UE).

In step 3 of FIG. 10, the UE is described to send, over the default DRB, an uplink data packet including user-plane data and a QFI. It will also be appreciated that the UE may be configured to send a 'header-only' uplink data packet, similar to the data packet sent by the base station in step 5. In this case, the UE can indicate to the network, before attempting to send data using an incorrect DRB, that it has uplink data packets (with a particular QFI value) for which the UE does not have DRB mapping information (e.g. for a new QoS Flow or for an existing QoS Flow for which the DRB mapping information has expired).

It will be appreciated that step 5 of FIG. 10 may take place before the UE sending any uplink data packets to the base station, e.g. following (immediately after) establishment of a bearer (e.g. other than a default DRB) or upon expiry of an associated timer. In particular, the base station may be configured to send, via the correct DRB, an appropriate (user-plane) downlink data packet (one that does not include any user data) before arrival of any uplink/downlink data on the QoS flow associated with a particular QFI. Thus, based on the received downlink data packet and before sending/receiving any data on that particular QoS flow, the UE is able to establish its DRB mapping information to reflect the correct mapping of the QFI indicated in the downlink data packet to the DRB via which the downlink data packet was received.

It will also be appreciated that the above described downlink data packet (without any user data) may also be used to change an existing mapping rule (also called QoS flow to DRB remapping). For example, the base station may be configured to send an appropriate (user-plane) downlink data packet which does not include any user data via the new mapped DRB, and the UE may be configured to remap the QFI(s) in the downlink packet to the new DRB.

It will be appreciated that the above example embodiments may be applied to both 5G New Radio and LTE systems (E-UTRAN).

In the above description, the UE, the access network node (base station), and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the access network node (base station), and the core network node as a signal over a computer network, or on a recording medium. Further, the functionality performed by part or all of this software may be performed using one or more dedicated hardware circuits. However, the use of software modules is preferred as it facilitates the updating of the UE, the access network node, and the core network node in order to update their functionalities.

The above example embodiments are also applicable to 'non-mobile' or generally stationary user equipment.

The first method may comprise sending, prior to said receiving at least one downlink data packet that includes information identifying a data flow, at least one uplink data packet for the identified data flow. In this case, the method may comprise sending the at least one uplink data packet via a default DRB. The second method may comprise receiving (e.g. via a default DRB), prior to said transmitting at least one downlink data packet that includes information identifying a data flow, at least one uplink data packet for the identified data flow. The second method may comprise transmitting the at least one downlink data packet upon establishment of said DRB with the UE.

The first method may comprise receiving the at least one downlink data packet upon establishment of the DRB with an access network. The information identifying the data flow may comprise a 'QoS Flow Identifier' (QFI). The at least one downlink data packet may comprise a header including a 'Reflective QoS flow to DRB mapping Indication' (RDI), and a QFI associated with that data flow.

In one possibility, the at least one downlink data packet does not include any user-plane data for the UE associated with that flow. The at least one downlink data packet may comprise a header portion without a data portion. The at least one downlink data packet may comprise a header portion with an empty data portion.

The at least one downlink data packet may comprise at least one Service Data Adaptation Protocol (SDAP) Protocol Data Unit (PDU). The data flow may comprise a Quality of Service (QoS) data flow.

The determining, in the above described third method, may comprise receiving (e.g. via a default DRB or a DRB that is no longer mapped to that data flow) at least one uplink data packet from the UE comprising an identifier of that data flow. The step of providing information may comprise sending at least one signalling message to the control plane entity, the at least one signalling message comprising information identifying at least one of: information identifying a data flow for which the UE does not have information identifying a mapping to a DRB; and information identifying a data flow for which the UE has information identifying a mapping to an incorrect DRB.

The step of obtaining information by the control plane entity may comprise receiving at least one signalling message from the user plane entity, the at least one signalling message comprising information identifying at least one of: information identifying a data flow for which the UE does not have information identifying a mapping to a DRB; information identifying a data flow for which the UE has information identifying a mapping to a default DRB; and information identifying a data flow for which the UE has information identifying a mapping to an incorrect DRB.

The at least one signalling message may comprise a 'Bearer Context Modification Required' message (and/or the like). The user plane entity comprises a central unit for user plane signalling (CU-UP). The control plane entity may comprise a central unit for control plane signalling (CU-CP).

Various other modifications will be apparent to those skilled in the art and will not be described in further detail here.

This application is based upon and claims the benefit of priority from United Kingdom Patent Application No. 1811311.8, filed on Jul. 10, 2018, the disclosure of which is incorporated herein in its entirety by reference.

What is claimed is:

1. A method performed by a user plane entity of a distributed base station, the method comprising:
   receiving, from a user equipment (UE), an uplink data packet corresponding to a data flow, the uplink data packet comprising a specific Quality of Service (QoS) Flow Identifier (QFI);
   determining that the QFI in the uplink data packed is not configured;
   transmitting, to a control plane entity of the distributed base station, information indicating that the QFI in the uplink data packed is not configured; and
   transmitting, to the UE via a data radio bearer (DRB), a downlink data packet corresponding to the data flow, the downlink data packet comprising one octet header information comprising a Reflective QoS flow to DRB mapping Indication (RDI), a Reflective QoS Indication (RQI), and the QFI;
   wherein the RDI causes the UE to update mapping between the data flow and the DRB, and
   wherein the information indicating that the QFI in the uplink data packed is not configured comprises a list including at least one combination of a Protocol Data Unit (PDU) session Identifier (ID) and a QoS Flow List.

2. A user plane entity of a distributed base station, comprising:
   a transceiver; and
   a controller, wherein the controller is configured to:
      control the transceiver to receive, from a user equipment (UE), an uplink data packet corresponding to a data flow, the uplink data packet comprising a specific Quality of Service (QoS) Flow Identifier (QFI);
      determine that the QFI in the uplink data packet is not configured;
      control the transceiver to transmit, to a control plane entity of the distributed base station, information indicating that the QFI in the uplink data packet is not configured; and
      control the transceiver to transmit, to the UE via a data radio bearer (DRB), a downlink data packed corresponding to the data flow, the downlink data packet comprising one octet header information comprising a Reflective QoS flow to DRB mapping Indication (RDI), a Reflective QoS Indication (RQI), and the QFI;
   wherein the RDI causes the UE to update mapping between the data flow and the DRB, and
   wherein the information indicating that the QFI in the uplink data packed is not configured comprises a list including at least one combination of a Protocol Data Unit (PDU) session Identifier (ID) and a QoS Flow List.

3. A method performed by a user equipment (UE), the method comprising:
   transmitting, to a user plane entity of a distributed base station, an uplink data packet corresponding to a data flow, the uplink data packet comprising a specific Quality of Service (QoS) Flow Indicator (QFI);
   in a case in which the user plane entity of the distributed base station determines that the QFI in the uplink data packed is not configured, receiving, from the user plane entity of the distributed base station via a data radio bearer (DRB), a downlink data packet corresponding to the data flow, the downlink data packet comprising one octet header information comprising a Reflective QoS flow to DRB mapping Indication (RDI), a Reflective QoS Indication (RQI), and the QFI; and
   updating mapping between the data flow and the DRB based on the RDI;
   wherein the information indicating that the QFI in the uplink data packed is not configured comprises a list including at least one combination of a Protocol Data Unit (PDU) session Identifier (ID) and a QoS Flow List.

4. A user equipment (UE) comprising:
   a transceiver; and
   a controller, wherein the controller is configured to:
      control the transceiver to transmit, to a user plane entity of a distributed base station, an uplink data packet corresponding to a data flow, the uplink data packet comprising a specific Quality of Service (QoS) Flow Identifier (QFI);
      control the transceiver to receive, from the user plane entity of the distributed base station via a data radio bearer (DRB), a downlink data packed corresponding to the data flow, the downlink data packet comprising one octet header information comprising a Reflective QoS flow to DRB mapping Indication (RDI), a Reflective QoS Indication (RQI), and the QFI, in a case in which the user plane entity of the distributed base station determines that the QFI in the uplink data packet is not configured; and
      update mapping between the data flow and the DRB based on the RDI,
   wherein the information indicating that the QFI in the uplink data packed is not configured comprises a list including at least one combination of a Protocol Data Unit (PDU) session Identifier (ID) and a QoS Flow List.

* * * * *

UNITED STATES PATENT AND TRADEMARK OFFICE
CERTIFICATE OF CORRECTION

PATENT NO. : 11,991,694 B2
APPLICATION NO. : 17/258343
DATED : May 21, 2024
INVENTOR(S) : Yuhua Chen Page 1 of 1

It is certified that error appears in the above-identified patent and that said Letters Patent is hereby corrected as shown below:

In the Claims

Column 17, Line 15, Claim 1, please replace "packed" with --packet--.

Column 17, Line 19, Claim 1, please replace "packed" with --packet--.

Column 17, Line 29, Claim 1, please replace "packed" with --packet--.

Column 17, Line 48, Claim 2, please replace "packed" with --packet--.

Column 18, Line 15, Claim 3, please replace "packed" with --packet--.

Column 18, Line 25, Claim 3, please replace "packed" with --packet--.

Column 18, Line 40, Claim 4, please replace "packed" with --packet--.

Column 18, Line 51, Claim 4, please replace "packed" with --packet--.

Signed and Sealed this
Twenty-fourth Day of June, 2025

Coke Morgan Stewart
*Acting Director of the United States Patent and Trademark Office*